United States Patent [19]
Horwitz et al.

[11] Patent Number: 5,229,592
[45] Date of Patent: Jul. 20, 1993

[54] REAL SCENE IMAGING SYSTEM PUPIL PHASING METHOD AND APPARATUS

[75] Inventors: Bruce A. Horwitz, Newton; John T. Watson, Lexington, both of Mass.

[73] Assignee: Litton Systems, Inc., Lexington, Mass.

[21] Appl. No.: 911,412

[22] Filed: Jul. 10, 1992

[51] Int. Cl.[5] .............................................. G01J 1/20
[52] U.S. Cl. .................... 250/201.9; 356/121
[58] Field of Search ............. 250/201.9, 214 R, 216; 356/121; 359/849

[56] References Cited

U.S. PATENT DOCUMENTS 4,943,709 7/1990 Grinberg et al. ............... 250/201.9

*Primary Examiner*—David C. Nelms
*Attorney, Agent, or Firm*—Michael H. Wallach; Robert F. Rotella

[57] ABSTRACT

A method and apparatus for phasing the apertures of a multiple-aperture imaging system is disclosed. An imaging system gathers light in either a scanning or a staring mode from a natural or real scene without artificial light sources. The spatial frequency of the image is sensed. The phase of the apertures is adjusted until the spectral power is maximized within a preselected spatial frequency band. When the spectral power is maximized, the apertures are optimally phased.

26 Claims, 4 Drawing Sheets

REAL SCENE IMAGING SYSTEM PUPIL PHASING METHOD AND APPARATUS

BACKGROUND OF THE INVENTION

Resolution of imaging systems is ultimately controlled by the physical pupil or aperture size. Unfortunately, large monolithic pupil sizes are often incompatible with a number of engineering and manufacturing constraints.

An alternative to a monolithic pupil imaging system is a multi-pupil imaging system. Two such systems are the segmented pupil imaging system and the multiple pupil imaging system. The segmented pupil system has effectively one large pupil created by making individual segments of the pupil and placing them together. The individual segments are oriented by tip and tilt and piston adjustments to form one smooth optical aperture such that light from an object passing through each of the segments comes together as a single image on a single focal plane. These inter-pupil adjustments assure that an image is formed on the focal plane as it would be with a single non-segmented pupil.

In the multiple pupil system, several separated imaging systems are used. A series of optical elements is used to combine the images onto a common focal plane. As with the segmented pupil, tip and tilt and piston adjustments assure that the images of an object formed by each aperture add coherently as a single image on the focal plane.

In both of these multi-pupil systems, the tip and tilt adjustments increase the intensity of the image by overlapping the images from each pupil. However, resolution of the system is not optimized. The resolution of an imaging system is a measure of its ability to reproduce high spatial frequencies in an image which are present in the scene being imaged. In multi-pupil imaging systems, resolution is a function of inter-pupil piston displacements or phase adjustments. As the inter-pupil phase difference is reduced, the resolution of the multi-pupil imaging system improves.

SUMMARY OF THE INVENTION

The present invention is a method and apparatus for phasing the pupils in a multi-pupil imaging system. An image produced by a system with phased pupils will have greater high spatial frequency content than will an image of the same scene formed by a system with non-phased pupils. A predetermined spatial frequency band is selected and the spectral power in the image within the selected spatial frequency band is sensed. Then the inter-pupil phases are adjusted until the sensed spectral power in the selected frequency band is maximized.

In one embodiment, the selected spatial frequency band is chosen in relation to the modulation transfer function (MTF) of the system. The band lies between the cutoff frequency of a single pupil and the cutoff frequency of a multiple pupil.

The present invention phases the pupils of an imaging system without the need for active light sources of any kind. Consequently, the phasing process can be carried out by gathering reflected light from a natural scene. Thus, the imaging system can be phased by viewing the scene to be imaged or one having similar characteristics.

The present invention is applicable to different types of multi-pupil systems. Specifically, the invention can be used on either segmented pupil systems or multiple pupil systems.

In one embodiment, the present invention operates in a scanning mode. In this mode, the images move continuously with respect to a phasing detector within the imaging system. The imaged light from the pupils also falls upon an image detector. The phasing detector may be a single slit followed by a photodetector or a grating followed by a photodetector. A CCD TV camera in which each pixel acts as a photodetector can also be used. In the latter case, the CCD camera can serve the dual function of phasing detector and image detector. In the scanning mode, the scanning process has the effect of converting the spatial frequencies of the imaged light to time varying electrical signals output by the various detectors. The spectral content of these electrical signals is analyzed, and the phase of the pupils is adjusted to maximize the spectral power in the selected frequency band.

In another embodiment, the invention operates in a staring mode. In this mode, the light from an entire scene falls upon the phasing sensor at one time. In this embodiment, the phasing sensor comprises a CCD TV camera which gathers the light from the image. Once again, the CCD camera can serve as phasing sensor and image sensor. Each pixel in the camera holds data pertaining to the light which it receives. The pixels in the camera are rasterized, that is, arranged horizontally across the image one line at a time. The rasterized data can be read from the camera one pixel at a time and analyzed. Because the data is read one pixel at a time, the spatial frequency of the image is again converted to time-varying signals. The time varying signals are analyzed to phase the pupils. This method of analyzing the rasterized data as it is output from the camera allows the phasing process to be performed without a large data memory requirement. In another embodiment, the pixel data is read from the camera and stored. Then, a two-dimensional Fourier transform is performed on the image data to carry out the required frequency analysis.

In one embodiment of the invention, the pupils are phased in pairs. In a system with several pupils, the pairs are chosen such that when the phasing process is completed on all pairs, all of the pupils are phased.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
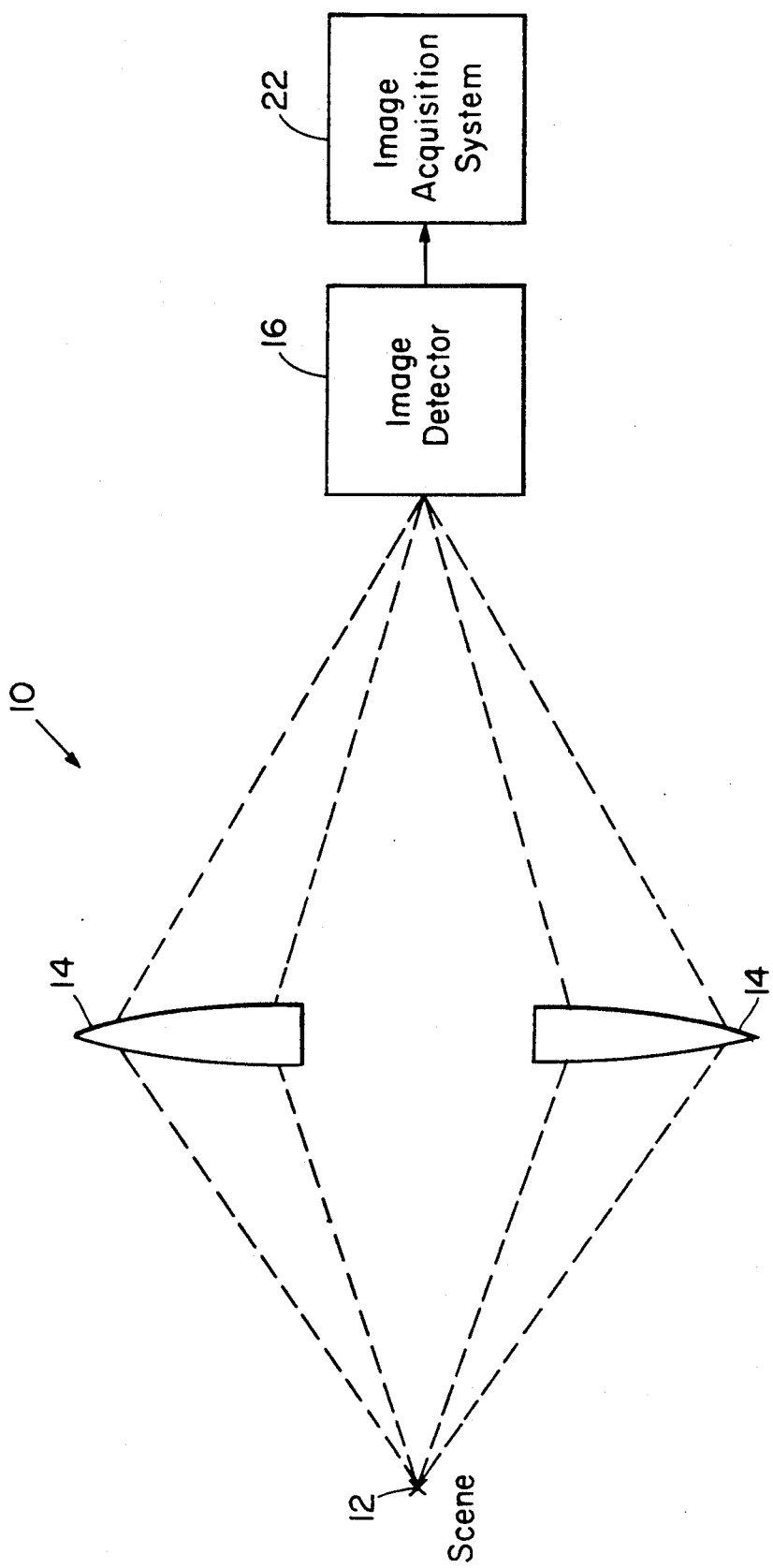
FIG. 1 schematically depicts a dual segmented pupil imaging system.

FIG. 1 schematically depicts two segments of a segmented pupil imaging system 10. Incoherent white light from a scene 12 enters the system 10 via pupil lenses 14. Tip and tilt adjustments have been made to lenses 14 such that the individual images of the scene 12 come together at an image detector 16. The image detector 16 converts the optical image to electrical signals and transmits the signals to an image acquisition system 22. The image acquisition system 22 may be a TV display which receives the electrical signals from the image detector 16 and displays the image.

Before the phasing process begins, a spatial frequency band called the "phasing band" is selected. The range selected for the phasing band generally depends upon the geometry of the apertures and the power spectrum of the expected scene. If high spatial frequencies are expected in the scene, then a relatively high frequency phasing band is selected.

Figure 2:
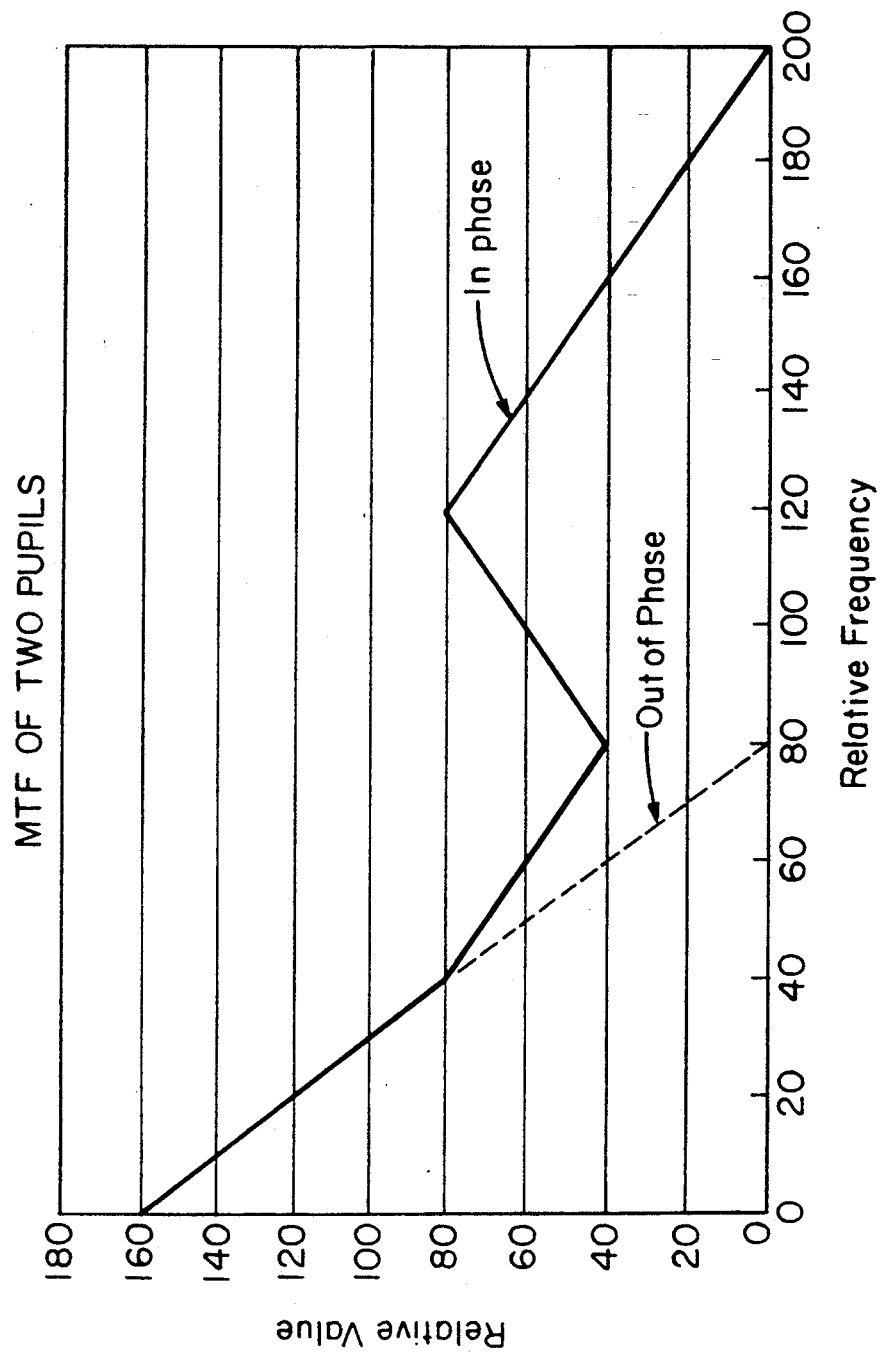
FIG. 2 is a plot of modulation transfer function of a dual-pupil imaging system.

FIG. 2 depicts the modulation transfer function (MTF) of a dual pupil system as a function of frequency. The MTF represents the ability of an imaging system to faithfully image a scene as a function of the spatial frequency of the scene. As can be seen from FIG. 2, when the pupils are out of phase, the system behaves as a single pupil system, having a relatively low cutoff frequency. However, when the pupils are in phase, the resolution of the system beyond the single pupil cutoff improves. A local maximum can be observed at a spatial frequency between the single pupil and dual pupil cutoff frequencies. The range of frequencies defining this maximum between about 80 and 200 on the relative frequency scale is the phasing band. It starts near the cutoff frequency for a single pupil and extends toward the cutoff for the dual pupil. When the spectral power within this band is at its maximum, then the pupils are optimally phased.

Figure 3:
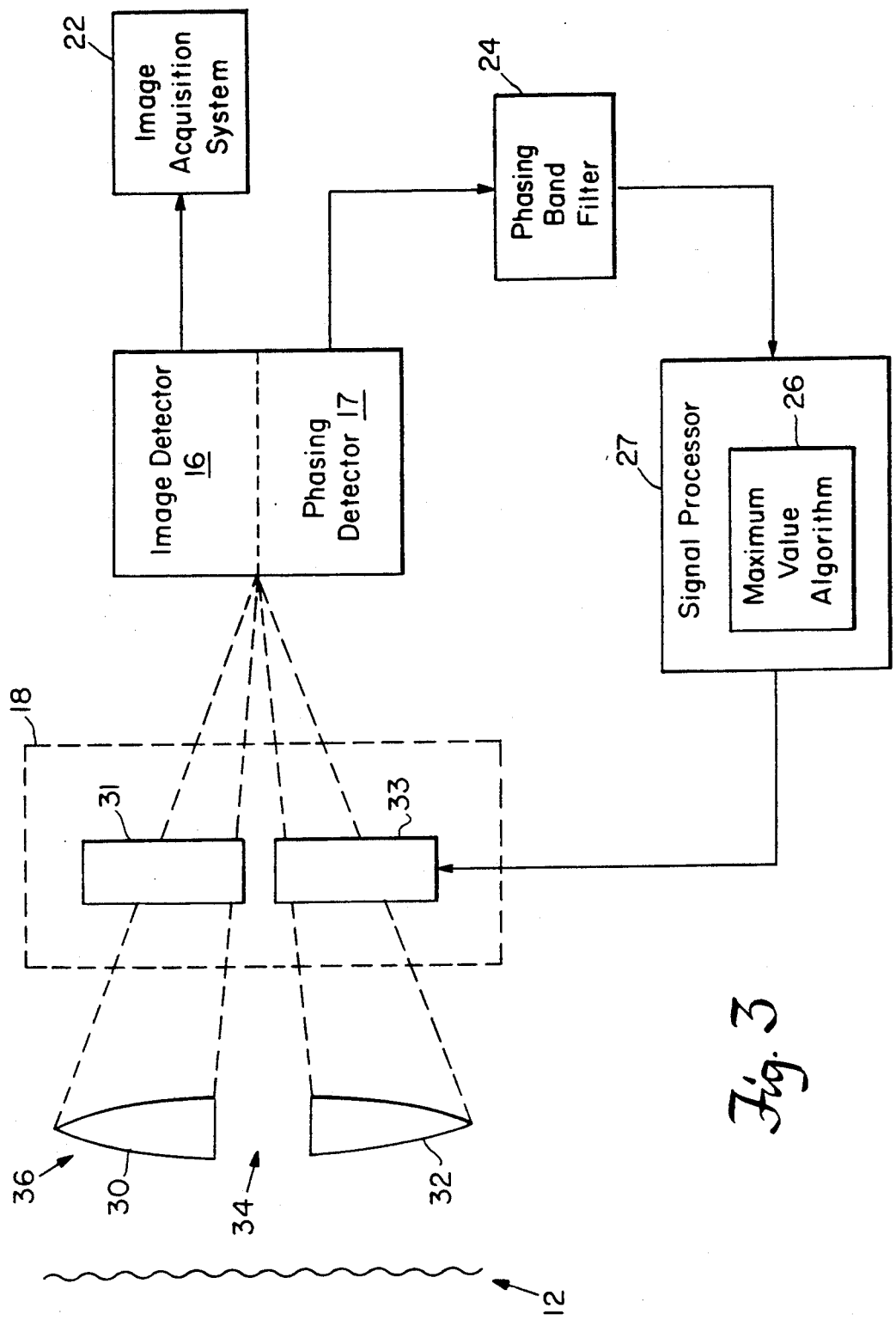
FIG. 3 schematically depicts an embodiment of the present invention in a segmented pupil imaging system.

FIG. 3 is a block diagram of two segments of a segmented pupil embodiment of the imaging system 10 of the present invention. The segmented pupil 36 comprises two segments or sub-pupils 30 and 32 which are manufactured individually and then placed together at junction 34. Light from a scene 12 enters sub-pupils 30, 32. Tip and tilt adjustments have been made to the sub-pupils 30, 32. The light from the sub-pupils 30, 32 is coupled to the image detector 16 and the phasing detector 17 by optical coupling apparatus 18. The optical coupling apparatus 18 includes optical instruments such as phase shifters 31 and 33 which can be used to adjust the phase of the incoming optical signals. The image detector 16 converts the optical image to electrical signals and transmits the signals to an image acquisition system 22 such as a display. In parallel with the image detector 16, the phasing detector 17 converts the optical signals to electrical signals and transmits them to a phasing band filter 24. These electrical signals have temporal frequencies which correspond with the spatial frequencies of the incoming image. The filter 24 is a band pass filter which passes only temporal frequencies corresponding to spatial frequencies within the selected phasing band as well as those signals required for normalization. The signals are then passed to signal processor 27. The signal processor 27 comprises spectrum analysis equipment which inputs the signals from the phasing band filter 24 and outputs an indication of the signals' spectral power. The signal processor 27 also comprises a maximum value finding algorithm 26 used to determine if the spectral power of the signals is at its maximum within the selected frequency band while accounting for changes in scene characteristics. If the spectral power is not at its maximum, a correction signal is generated by the signal processor 27 and transmitted to phase shifter 33 in the optical coupling apparatus 18 to adjust the phase of the optical signal entering through pupil 32. A correction signal can also be generated and transmitted to phase shifter 31 to adjust the phase of pupil 30. This process continues until the maximum value finding algorithm 26 determines that the spectral power is at its maximum. When it is, the pair of sub-pupils 30 and 32 is optimally phased.

In systems with more than two sub-pupils, this process is repeated for the remaining sub-pupils, one pair at a time. The pairs are chosen such that when all pairs are phased, all of the sub-pupils are phased. For example, for a five-sub-pupil system with sub-pupils numbered from 1 to 5, possible sub-pupil pair phasing orders are: 1-2, 2-3, 3-4, 4-5, or 1-2, 1-3, 1-4, 1-5, or 1-2, 3-4, 4-5, 5-1, 2-3.

Phasing detector 17 receives light in one of two modes—scanning or staring. In the scanning mode, the scene 12 passes in front of the sub-pupils 30, 32. This typically occurs in applications such as aerial reconnaissance where the sub-pupils are fixed to an aircraft to observe a ground scene as the aircraft flies over it. The light from the passing scene 12 enters the imaging system 10 and is received by the phasing detector 17. Alternatively, a scanning mechanism in the optical coupling apparatus 18 may scan a fixed image across phasing sensor 17.

In the scanning mode, in one embodiment, the detector 17 comprises a single slit followed by a photodetector. As the image moves over the slit, the image spatial frequencies are converted to time-varying signals by the photodetector. Thus the output of the phasing detector 17 can be analyzed by the signal processor 27 by known temporal frequency analysis techniques.

In another embodiment, the phasing detector 17 comprises a grating followed by a photodetector. As with the single slit detector, the grating detector converts the image spatial frequencies into time-varying electrical signals.

In another embodiment, a CCD TV camera is used in the scanning mode in conjunction with slits or gratings on the scale of the CCD pixels. As the image moves across the CCD camera, each pixel acts as an individual photodetector. Once again, the time variation of each pixel can be sensed to indicate the spatial frequency of the image. When the CCD camera is used, it can serve as both the image detector 16 and the phasing detector 17.

In the staring mode, the scene 12 does not move with respect to the sub-pupils 30 and 32. Light from the entire scene 12 falls upon the phasing detector 17 at the same time. In this mode, the phasing detector 17 comprises a CCD TV camera. Once again, the CCD camera can serve as the image detector 16. In the camera, data is stored for each pixel. Each piece of data represents the light from the scene which falls upon the corresponding pixel.

Because of the rasterization of the TV camera, the pixel data is read from the camera one pixel at a time horizontally across each line. Like the scanning mode embodiments, this also allows a conversion from the spatial frequency of the image to the temporal frequency of the changing pixel data. Once again, standard well-known frequency domain analysis can be carried out to sense the spectral power in the image to optimize the phasing of the sub-pupils. Alternatively, all of the pixel data can be read from the CCD camera and stored.

A two-dimensional Fourier transform is then performed on the image data as part of the spectral analysis.

Figure 4:
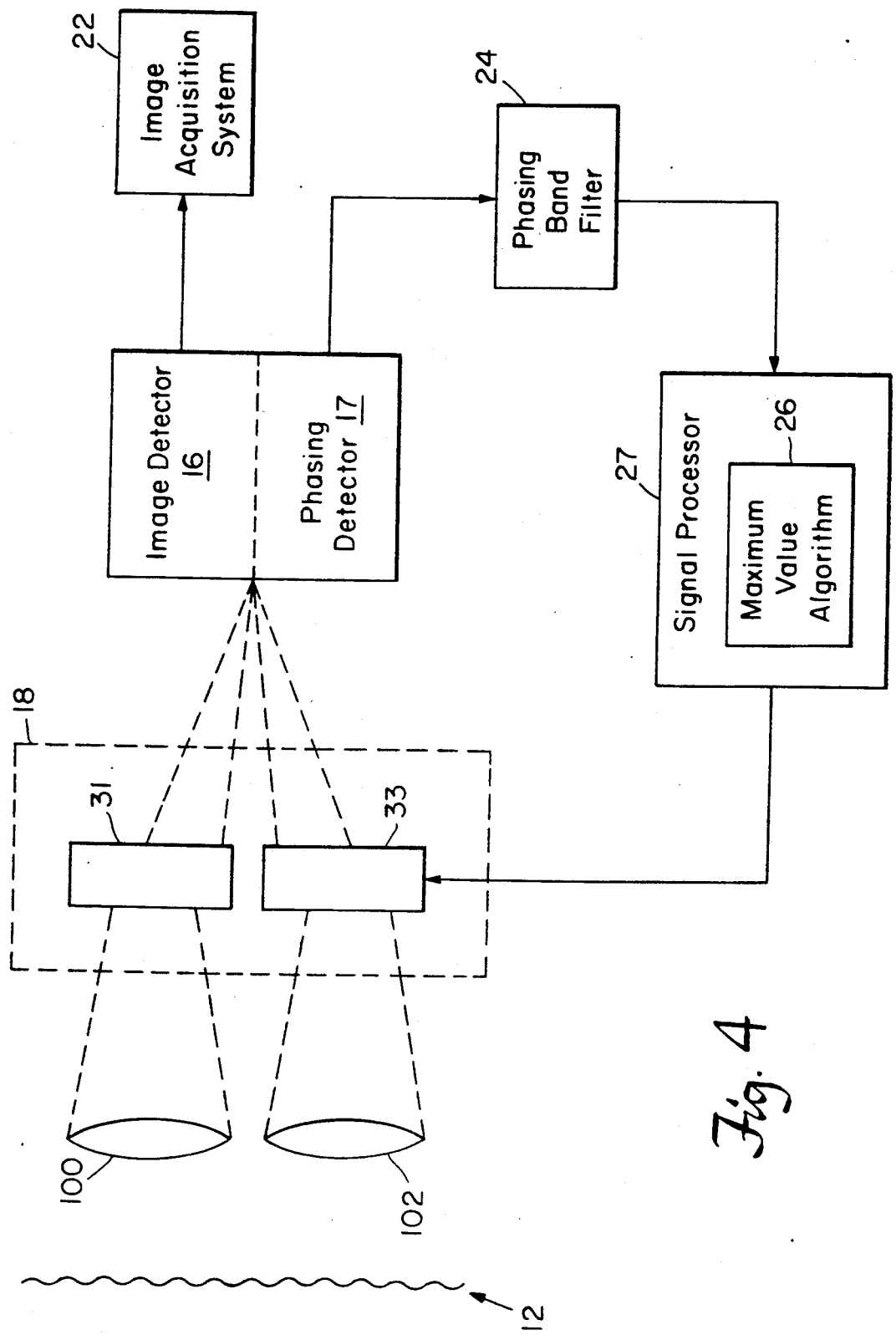
FIG. 4 schematically depicts another embodiment of the present invention in a dual pupil imaging system.

FIG. 4 depicts a dual-pupil embodiment of the present invention. As with the segmented pupil embodiment, tip and tilt adjustments have been made to the pupils 100 and 102 to ensure a single image at the image detector 16 and the phasing detector 17.

Functionally, the embodiment of FIG. 4 is the same as that of FIG. 3. Input optical signals are coupled to phasing detector 17 by optical coupling apparatus 18 consisting of phase shifters 31 and 33. The signal processor 27 transmits a correction signal to phase shifter 33 to adjust the phase of pupil 102 to maximize the spectral power in the signals out of the phasing band filter 24. Alternatively, the signal processor may transmit a correction signal to phase shifter 31 to adjust the phase of pupil 100.

The phasing sensor of the present invention uses the natural light from a scene entering the imaging system. The spatial frequency of the image formed of the scene is sensed and the phase of the pupils is adjusted until the spectral power in the selected frequency band is maximized. No additional external equipment such as lasers or other light sources are needed for the phasing process. This allows the phasing to be performed on any scene. Ideally, the system can be phased while viewing a scene having characteristics similar to those of the expected target scene. Thus, performance of the system while viewing the target scene is optimized.

Because the present invention uses polychromatic white light to perform the phasing process, true zero phase between pupils is achieved. A sensor which utilizes the concepts of the invention to phase pupils using true monochromatic incoming light will not phase, and a sensor using narrow band light will have such a broad maximum that it would not be useful. With white light, phasing of all wavelengths only occurs at true zero phase. Thus, if the pupils are phased with white light input to the phasing detector, they will be phased for any wavelength of incoming light. Many imaging systems filter the light received by the image sensor 16 such that only one wavelength of light is sensed. The pupils of such systems can also be brought to zero phase by the present invention as long as the light received by the phasing detector 17 is not filtered.

While this invention has been particularly shown and described with references to preferred embodiments thereof, it will be understood by those skilled in the art that various changes in form and details may be made therein without departing from the spirit and scope of the invention as defined by the appended claims.

We claim:

1. A method of phasing pupils in a multi-pupil imaging system comprising:
   selecting a predetermined spatial frequency band;
   sensing the spectral power in an image within the selected frequency band; and
   adjusting the inter-pupil phases to maximize the sensed spectral power.

2. The method of claim 1 wherein the system has a single-pupil spatial cutoff frequency above which a single pupil cannot resolve points in a scene and a multiple-pupil spatial cutoff frequency above which a multiple pupil cannot resolve points in a scene, and the predetermined frequency band is between the single-pupil cutoff frequency and the multiple-pupil cutoff frequency.

3. The method of claim 1 wherein the pupils comprise a plurality of individual pupils.

4. The method of claim 1 wherein the pupils are sub-pupils of a single segmented pupil.

5. The method of claim 1 wherein the sensing step comprises:
   scanning the image onto a phasing detector to create a time-varying signal; and
   sensing the temporal frequency of the signal.

6. The method of claim 5 wherein the phasing detector comprises a single slit and a photodetector.

7. The method of claim 5 wherein the phasing detector comprises a grating and a photodetector.

8. The method of claim 5 wherein the phasing detector comprises a CCD TV camera.

9. The method of claim 1 wherein the sensing step is performed in a staring mode in which the entire image is sensed at one time by a phasing detector.

10. The method of claim 9 wherein the phasing detector comprises a CCD TV camera.

11. The method of claim 10 wherein the CCD image data is processed one pixel at a time as it is read from the camera.

12. The method of claim 10 wherein the CCD image data is processed by a two-dimensional Fourier transform.

13. The method of claim 1 wherein the image is formed of a natural scene devoid of active light sources.

14. The method of claim 1 wherein the inter-pupil phases are adjusted one pair of pupils at a time.

15. An optical imaging system comprising:
   at least two pupils for admitting light into the system;
   a sensor for sensing the spatial spectral power of an image; and
   a phase adjuster for adjusting the inter-pupil phases to maximize the spectral power within a selected predetermined spatial frequency band.

16. The imaging system of claim 15 wherein the system has a single-pupil spatial cutoff frequency above which a single pupil cannot resolve points in a scene and a multiple-pupil spatial cutoff frequency above which a multiple pupil cannot resolve points in a scene, and the selected spatial frequency band is between the single-pupil cutoff frequency and the multiple-pupil cutoff frequency.

17. The imaging system of claim 15 wherein the pupils comprise a plurality of individual pupils.

18. The imaging system of claim 15 wherein the pupils are sub-pupils of a single segmented pupil.

19. The imaging system of claim 15 further comprising scanning means for scanning the image onto the sensor.

20. The imaging system of claim 19 wherein the sensor comprises a phasing detector, said phasing detector comprising a single slit and a photodetector.

21. The imaging system of claim 19 wherein the sensor comprises a phasing detector, said phasing detector comprising a grating and a photodetector.

22. The imaging system of claim 19 wherein the sensor comprises a phasing sensor, said phasing sensor comprising a CCD TV camera.

23. The imaging system of claim 15 further comprising staring means for providing the entire image to the sensor at one time.

24. The imaging system of claim 23 wherein the sensor comprises a phasing sensor, said phasing sensor comprising a CCD TV camera.

25. The imaging system of claim 15 wherein the image is formed of a natural scene devoid of active light sources.

26. The imaging system of claim 15 wherein the inter-pupil phases are adjusted one pair of pupils at a time.

* * * * *